(12) United States Patent
Kuscher et al.

(10) Patent No.: US 10,891,106 B2
(45) Date of Patent: Jan. 12, 2021

(54) AUTOMATIC BATCH VOICE COMMANDS

(71) Applicant: Google LLC, Mountain View, CA (US)

(72) Inventors: Alexander Friedrich Kuscher, San Francisco, CA (US); Santhosh Balasubramanian, Sunnyvale, CA (US); Tiantian Zha, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/882,353

(22) Filed: Oct. 13, 2015

(65) Prior Publication Data

US 2017/0102915 A1   Apr. 13, 2017

(51) Int. Cl.
*G06F 3/16* (2006.01)
*G06F 16/957* (2019.01)
*G06Q 10/02* (2012.01)
*G10L 15/22* (2006.01)

(52) U.S. Cl.
CPC .......... *G06F 3/167* (2013.01); *G06F 16/9574* (2019.01); *G06Q 10/025* (2013.01); *G10L 15/22* (2013.01); *G10L 2015/228* (2013.01)

(58) Field of Classification Search
CPC ... G10L 15/22; G10L 15/26; G10L 2015/228; G10L 15/183; H04L 51/32; H04L 51/046; G06F 3/167; G06F 17/30796
See application file for complete search history.

(56) References Cited

U.S. PATENT DOCUMENTS

| 6,978,303 | B1 |  | 12/2005 | McCreesh et al. |
| 7,757,234 | B2 |  | 7/2010 | Krebs |
| 8,296,377 | B1 | * | 10/2012 | Jablokov ............... 704/235 |
| 8,892,635 | B2 |  | 11/2014 | Sullivan et al. |
| 9,020,825 | B1 | * | 4/2015 | Garber ............. G06F 3/167 704/231 |
| 9,436,951 | B1 | * | 9/2016 | Jablokov ........... H04W 4/21 |
| 2006/0074658 | A1 | * | 4/2006 | Chadha ........... G10L 17/00 704/246 |
| 2006/0248404 | A1 |  | 11/2006 | Lindsay et al. |

(Continued)

FOREIGN PATENT DOCUMENTS

| CN |  104050967 A | 9/2014 |
| WO | WO-2010/141802 A1 | 12/2010 |
| WO | WO-2013/173511 A2 | 11/2013 |

OTHER PUBLICATIONS

International Search Report and Written Opinion dated Oct. 20, 2016, which issued in International Application No. PCT/US2016/045393.

(Continued)

*Primary Examiner* — Mark Villena
(74) *Attorney, Agent, or Firm* — Shumaker & Sieffert, P.A.

(57) ABSTRACT

Aspects of the subject technology relate to systems and methods for processing voice input data. Voice input data is received from a computing. An intended task is determined based on the received voice input data. Contextual information related to the intended task is obtained. A plurality of services to be accessed at the computing device is determined based on the intended task and the obtained contextual information. Instructions associated with the plurality of services are provided for transmission to the computing device for execution at the computing device.

20 Claims, 4 Drawing Sheets

(56) References Cited

U.S. PATENT DOCUMENTS

| | | | |
|---|---|---|---|
| 2006/0265217 A1* | 11/2006 | Bicego | G10L 15/22 704/231 |
| 2008/0228496 A1 | 9/2008 | Yu et al. | |
| 2008/0255851 A1* | 10/2008 | Ativanichayaphong | G10L 15/265 704/275 |
| 2009/0113444 A1 | 4/2009 | Hackborn et al. | |
| 2009/0241031 A1 | 9/2009 | Gamaley et al. | |
| 2010/0031166 A1* | 2/2010 | Choudhary | G06F 17/30884 715/760 |
| 2010/0058200 A1* | 3/2010 | Jablokov | G06Q 30/02 715/752 |
| 2010/0097319 A1 | 4/2010 | Billard et al. | |
| 2010/0115334 A1 | 5/2010 | Malleck et al. | |
| 2010/0317406 A1 | 12/2010 | Shigeta | |
| 2011/0301955 A1* | 12/2011 | Byrne | G10L 15/22 704/251 |
| 2012/0060083 A1* | 3/2012 | Yuan | G06F 17/30899 715/234 |
| 2012/0167117 A1 | 6/2012 | Kekeh et al. | |
| 2012/0303445 A1* | 11/2012 | Jablokov | G06Q 30/02 705/14.42 |
| 2013/0073568 A1* | 3/2013 | Federov | G06Q 50/01 707/749 |
| 2013/0110615 A1* | 5/2013 | Lee | G06Q 30/0242 705/14.41 |
| 2013/0110992 A1* | 5/2013 | Ravindra | H04W 8/18 709/220 |
| 2013/0185072 A1* | 7/2013 | Huang | G10L 15/30 704/246 |
| 2013/0226590 A1* | 8/2013 | Lee | G06F 3/167 704/275 |
| 2013/0238326 A1 | 9/2013 | Kim et al. | |
| 2013/0246050 A1* | 9/2013 | Yu | G10L 15/1822 704/9 |
| 2013/0290233 A1 | 10/2013 | Ferren et al. | |
| 2014/0013353 A1* | 1/2014 | Mathur | G06Q 50/01 725/34 |
| 2014/0152597 A1 | 6/2014 | Lee | |
| 2014/0184496 A1 | 7/2014 | Gribetz et al. | |
| 2014/0189572 A1 | 7/2014 | Martens et al. | |
| 2014/0207446 A1* | 7/2014 | Klein | G10L 21/10 704/233 |
| 2014/0229477 A1 | 8/2014 | Costello et al. | |
| 2014/0278435 A1* | 9/2014 | Ganong, III | G10L 15/22 704/275 |
| 2014/0278436 A1 | 9/2014 | Khanna et al. | |
| 2014/0298172 A1 | 10/2014 | Choi | |
| 2014/0302470 A1 | 10/2014 | Zapantis et al. | |
| 2014/0365956 A1* | 12/2014 | Karunamuni | G06F 3/04847 715/788 |
| 2015/0026615 A1 | 1/2015 | Choi et al. | |
| 2015/0170172 A1* | 6/2015 | Gichuhi | G06Q 30/02 705/7.32 |
| 2015/0199965 A1* | 7/2015 | Leak | G10L 15/22 704/249 |
| 2015/0205462 A1* | 7/2015 | Jitkoff | G06F 3/0483 715/777 |
| 2015/0215665 A1* | 7/2015 | Casagrande | H04N 21/233 725/32 |
| 2015/0228275 A1* | 8/2015 | Watanabe | G10L 15/142 704/275 |
| 2015/0254058 A1* | 9/2015 | Klein | G06F 3/167 704/275 |
| 2015/0254216 A1* | 9/2015 | DeLuca | G06F 17/3087 715/206 |
| 2015/0255086 A1* | 9/2015 | Pujari | G06F 3/0481 704/270.1 |
| 2015/0279366 A1* | 10/2015 | Krestnikov | G10L 15/26 704/235 |
| 2015/0332673 A1* | 11/2015 | Li | G06F 17/276 704/235 |
| 2015/0339754 A1* | 11/2015 | Bloem | G06Q 30/0631 705/26.7 |
| 2015/0340042 A1* | 11/2015 | Sejnoha | H04M 1/72519 704/275 |
| 2016/0004501 A1* | 1/2016 | Kar | G10L 15/22 704/234 |
| 2016/0139750 A1* | 5/2016 | Barrus | G06F 3/0483 715/777 |
| 2016/0147400 A1* | 5/2016 | Patten | G06F 3/0484 715/753 |
| 2016/0170592 A1* | 6/2016 | DeLuca | G06F 3/0483 715/777 |
| 2017/0199638 A1* | 7/2017 | Bhupatiraju | G06F 16/9577 |
| 2017/0220361 A1 | 8/2017 | Sharma et al. | |
| 2018/0260081 A1* | 9/2018 | Beaudoin | G06F 9/445 |

OTHER PUBLICATIONS

International Search Report and Written Opinion dated Nov. 22, 2016, which issued in International Application No. PCT/US2016/054524.

Communication pursuant to Rule 161(1) and 162 EPC from counterpart European Application 16781623.0, dated May 23, 2018, 3 pgs.

Response to Communication pursuant to Rule 161(1) and 162 EPC from counterpart European Application 16781623.0, dated May 23, 2018, filed Dec. 3, 2018, 12 pgs.

Communication pursuant to Article 94(3) EPC from counterpart European Application 16781623.0, dated Dec. 17, 2019, 7 pgs.

International Preliminary Report on Patentability from counterpart International Application No. PCT/US2016/054524, dated Apr. 17, 2018, 6 pgs.

Response to Examination Report from counterpart EP 16781623.0 dated Dec. 17, 2019, filed Apr. 21, 2020, 14 pgs.

First Office Action and translation from counterpart CN Application No. 201680041581.0 dated Jun. 1, 2020, 55 pgs.

\* cited by examiner

AUTOMATIC BATCH VOICE COMMANDS

BACKGROUND

As computing devices become more advanced, users may be able to carry out more complex tasks. In some cases, it is more convenient to interact with computing devices without the use of traditional input/output peripherals like a keyboard. One such method is using voice input. Voice input may be used to access a feature of a computing device.

SUMMARY

Aspects of the subject technology relate to a computer-implemented method for utilizing voice input for initiating batch processes in a computing device. The method includes receiving voice input data from a computing device. The method further includes determining an intended task based on the received voice input data. The method further includes Obtaining contextual information related to the intended task. The method further includes determining a plurality of services to be accessed at the computing device based on the intended task and the obtained contextual information. The method further includes providing instructions associated with the plurality of services for transmission to the computing device and for execution at the computing device.

Aspects of the subject technology also relates to a system. The system includes one or more processors and a non-transitory computer-readable medium including instructions stored therein, which, when processed by the one or more processors, cause the one or more processors to perform operations. The operations include receiving voice input data from a computing device. The operations also include determining an intended task based on the received voice input data. The operations also include obtaining contextual information related to the intended task, where the contextual information comprises social graph information. The operations also include determining a plurality of services to be accessed at the computing device based on the intended task and the obtained contextual information. The operations also include providing instructions associated with the plurality of services for transmission to the computing device and for execution at the computing device.

Aspects of the subject technology also relates to a non-transitory machine-readable medium including instructions stored therein, which when executed by a machine, cause the machine to perform operations. The operations include receiving voice input data from a computing device. The operations also include determining an intended task based on the received voice input data. The operations also include obtaining contextual information related to the intended task. The operations also include determining a plurality of tabs to open based on the intended task and the obtained contextual information. The operations also include providing for opening the determined plurality of tabs.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The subject technology enables a user to utilize voice input to initiate batch processes on a computing device. Batch processes can involve accessing one or more services on the computing device. Accessing one or more services may be associated with using features of web services or applications on the computing device. According to various aspects, the computing device may be associated with a user account. The user account may be a cloud-based user account that is used to access various web services. Examples of web services include email, social network, operating system, web based applications (e.g., text editor, spreadsheet application, presentation application), among others. Access to the web services can be granted through authentication of user account credentials. User authentication may be initiated by signing into the user account through, for example, a web portal, a web application, application log-in page, among others.

Voice input data may be received from a computing device. In some embodiments, voice input data may be processed through speech recognition to determine one or more words corresponding to the voice input data and stored as text. An intended task may be determined based on the received voice input data. Contextual information related to the intended task may be obtained. Contextual information may include social graph information and user historical activity. A plurality of services to be accessed on the computing device may be determined based on the intended task and the contextual information. The plurality of services may be associated with applications or websites. Instructions associated with the plurality of services are provided for transmission to the computing device and for execution at the computing device.

Figure 1:
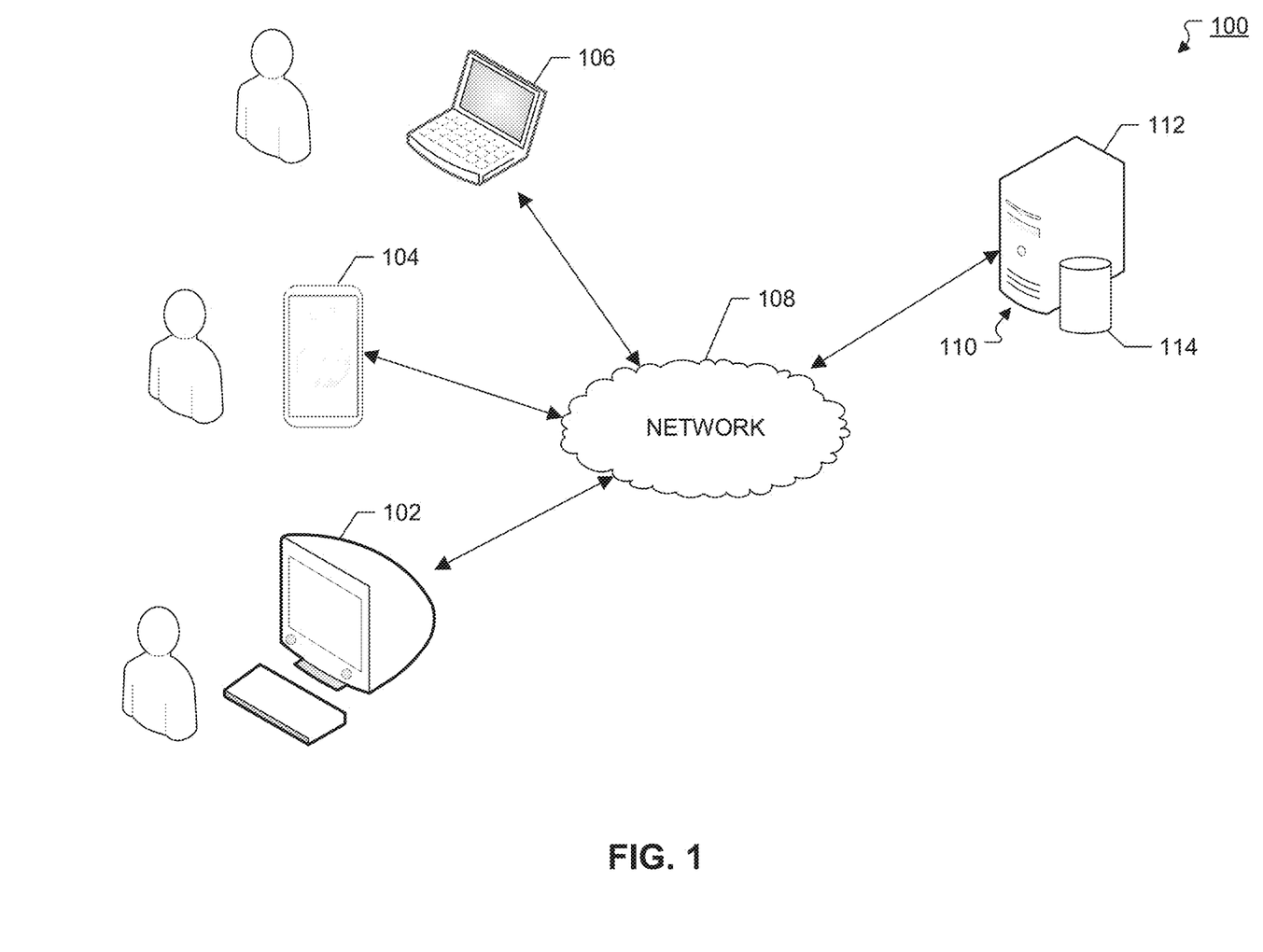
FIG. 1 illustrates an example network environment in accordance with various aspects of the subject technology.

FIG. 1 illustrates an example network environment 100 in which voice commands may be utilized for accessing a plurality of services at a computing device. The network environment 100 may include one or more computing devices 102, 104 and 106, network 108, and server 110. Each of the computing devices 102, 104 and 106, and server 110 can communicate with each other through a network 108. Server 110 can include one or more computing devices 112 and one or more data stores 114.

Computing devices 102, 104 and 106 can represent various forms of processing devices. By way of example and not of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, smart appliances or a combination of any of these data processing devices or other data processing devices. Some computing devices, such as computing devices 102, 104 and 106, may have the capabilities to process user voice input. For example, computing devices 102, 104 and 106 may include microphones, and may have instructions stored in memory, which when executed by their respective processors, allow computing devices 102, 104 and 106 to record the user voice commands. In addition, computing devices 102, 104 and 106 may include processing circuitry for speech recognition and voice recognition. Computing device 102, 104 and 106 may also include a speaker or an audio output connection.

According to various implementations, computing devices 102, 104 and 106 may be associated with an online or cloud-based user account. The user account may be a cloud-based user account that is used to access various web services. Examples of web services include email, social network, operating system, web based applications (e.g., text editor, spreadsheet application, presentation application), among others. Access to the web services can be granted through authentication of user account credentials. User authentication may be initiated by signing into the user account through, for example, a web portal, a web application, application log-in page, among others. Information stored in connection with the user account may be located in the data store 114 associated with the server 110. In some aspects, information stored in connection with the user account may be located on a separate server (not pictured).

The server 110 may be any system or device having a processor, a memory, and communications capability for exchanging data with other computing devices, including for example, computing devices 102, 104 and 106. The server 110 may utilize credential information associated with the cloud-based user account to access various web services associated with the cloud-based user account. In one more implementations, the server 110 can be a single computing device (e.g., computing device 112). In other implementations, the server 110 can represent more than one computing device working together to perform the actions of a computer server (e.g., server farm). Further, the server 110 can represent various forms of servers including, but not limited to, a web server, an application server, a proxy server, a network server, or a server farm.

In example aspects, the server 110 may process a voice input data to generate instructions to be sent to a client device (e.g., computing device 102, 104 or 106). For example, the server 110 may receive a voice input data. The voice input data may be a raw audio recording of a voice input from a user captured at the client device. In some implementations, the voice input data may comprise additional data associated with the voice input captured at the client device such as the location of the client device and the time when the voice input was captured. Based on the voice input data, the server 110 may determine an intended task. The server 110 can obtain contextual information based on the intended task. The contextual information may be retrieved from data store 114 and may also be associated with the user account. Based on the intended task and the obtained contextual information, the server 110 may determine a plurality of services to be accessed at the client device. The server 110 may provide instructions associated with the plurality of services for transmission to the computing device and for execution at the client device.

The computing devices, including computing devices 102, 104 and 106, and server 110, may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown), In addition, short-range communication may occur, for example, using a Bluetooth, WiFi, or other such transceiver.

In some aspects, network environment 100 can be a distributed client/server system that spans one or more networks such as, for example, network 108. Network 108 can be a large computer network such as, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 104 and 106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

Figure 2:
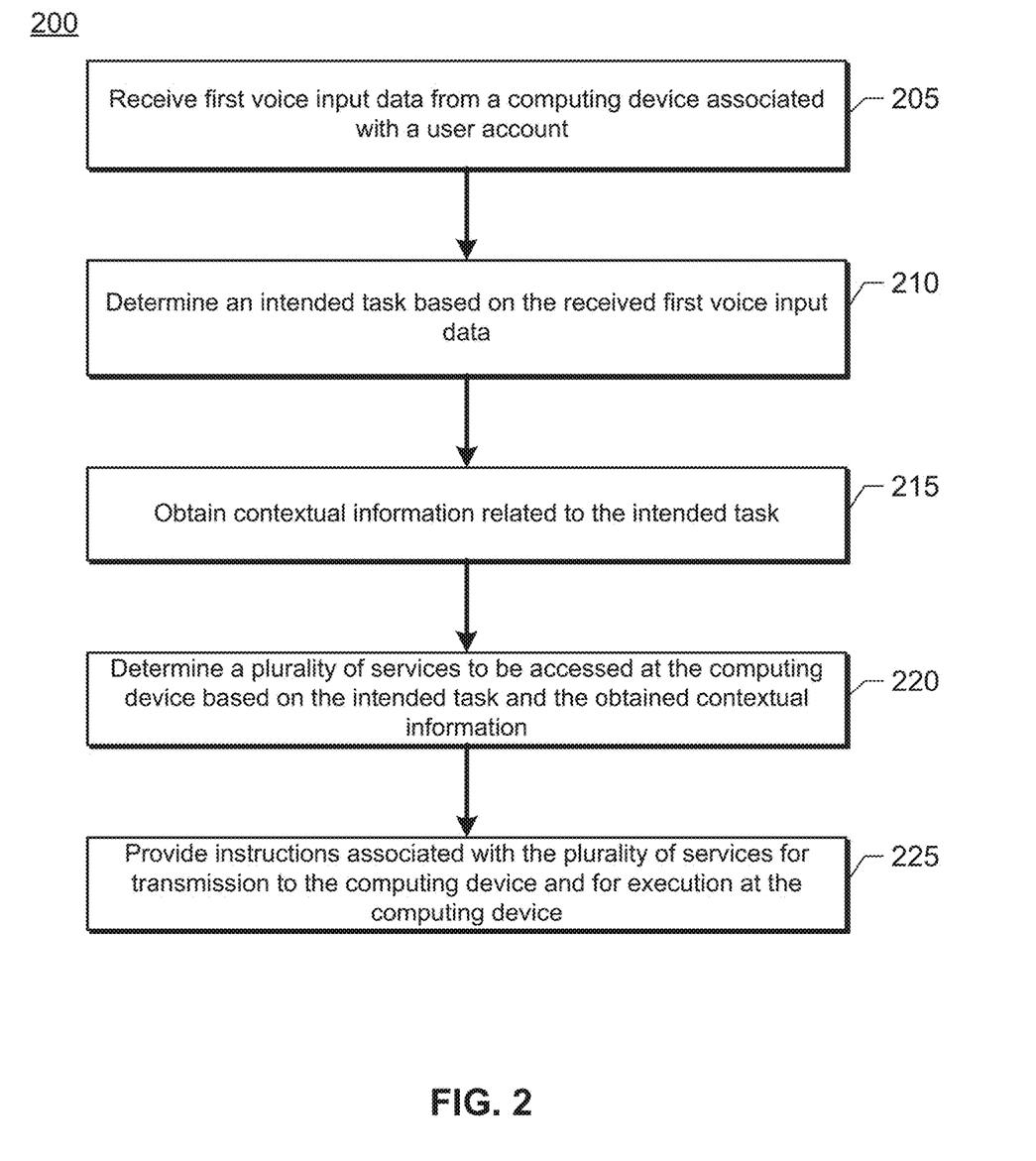
FIG. 2 shows a flowchart illustrating an example process 200 for processing voice commands, in accordance with various aspects of the subject technology.

FIG. 2 shows a flowchart illustrating an example process 200 for processing voice commands, in accordance with various aspects of the subject technology. The steps of the process 200 do not need to be performed in the order shown. It is understood that the depicted order is an illustration of one or more example approaches, and the subject technology is not meant to be limited to the specific order or hierarchy presented. The steps can be rearranged, and/or two or more of the steps can be performed simultaneously. FIG. 2 will be discussed with reference to FIG. 3.

In block 205 of FIG. 2, voice input data is received from a computing device (e.g., computing device 102). The voice input data may include, for example, a raw audio file recorded at the computing device 102, processed words based on the raw audio file, a location of the computing device 102, timestamp, among others. A user may speak a voice input for performing a task near the computing device 102. The computing device 102 may be always listening for a voice input and may detect the voice input through a microphone of the computing device 102. For example, the user may wish to plan a trip, and may state "I want to plan a trip" near the computing device 102. The computing device 102 may record the voice input (e.g., "I want to plan a trip") to create a raw audio file and send the voice input data comprising the raw audio file to the server 110. The server 110 may process the raw audio file to determine the words corresponding to the audio through, for example, the use of speech recognition. In some aspects, the computing device 102 may create the raw audio file of the voice input and may process the raw audio file to determine corresponding words. The determined words may be stored as text and the computing device 102 may send the voice input data to the server 110, where the voice input data comprises text corresponding to the determined words.

In some cases, the computing device 102 may be associated with a cloud-based user account. As mentioned previously, the user account may be associated with web services such as email, social network, web based applications, among others. The computing device 102 may have access to these services when a user is signed into the user account.

In some implementations, the computing device 102 may only process the voice input when user intent to use a voice command is detected. In some cases, computing device 102 may not detect voice input, until user intent to use a voice command is detected. User intent to use a voice command may be detected through user input through a button on the computing device 102 or a user element displayed on the computing device 102. In other cases, the computing device 102 may be always listening for voice input. The computing device 102 may detect the voice input through a microphone of the computing device 102 and may compare the voice input with a trigger phrase. The comparison may be done on computing device 102. Alternatively, the detected voice input may be sent to server 110 and the server 110 may compare the detected voice input with the trigger phrase. The trigger phrase may indicate that the user is intending to use a voice command. A trigger phrase may be predetermined by the user and may include a name of the computing device 102, such as, "Okay Device." For example, a user may wish to search vacation spots and may state "Okay device, search vacations spots near me" near computing device 102. The computing device 102 may detect, through its microphone, the phrase "Okay Device." The computing device 102 may determine that the trigger phrase has been detected and begin recording the rest of the voice input, for example, "search vacation spots near me." The voice input data comprising a recording of the voice input may be sent to the server 110 from the computing device 102.

In block 210 of FIG. 2, an intended task is determined based on the voice input data. In some implementations, the server 110 may determine that the voice input data is associated with the user through voice recognition before proceeding to the rest of the process 200. For example, the server 110 may access a sample voice recording of the user associated with the user account, and compare the sample voice recording with the voice input data to determine that the voice input data is associated with the user. The server 110 may ignore voice input data that is not associated with the user.

The server 110 may determine the intended task by comparing the received voice input data to a plurality of tasks available to the user. As mentioned previously, the voice input data may include a raw audio file of the voice input recorded at the computing device 102. The server 110 may process the raw audio file to determine corresponding words. The plurality of tasks available to the user may be stored in an indexed table. A comparison of the received voice data to a plurality of tasks available to the user may be done through searching the indexed table for each of the determined words. The search may be a linear search, a binary search, or any other search methods known in the art. In some cases, a confidence value may be calculated based on how close an entry in the indexed table is to the determined words. The confidence value may indicate how close an entry of the indexed table is to the determined words and may be based on, for example, the number of the determined words that matches portions of an entry in the index table. The server 110 may determine that the intended task corresponds to a task that matches the determined words. If no task in the plurality of tasks available to the user matches all of the determined words, then a task in the indexed table with the highest confidence value may be determined to be the intended task.

The server 110 may have access to a predetermined list of supported tasks from, for example, the data store 114. The list of supported tasks may comprise tasks that the server 110 may recognize and have corresponding instructions to be sent to the computing device 102. Each of the supported tasks may be associated with one or more services. In some cases, one or more tasks in the list of supported tasks may not be available to the computing device 102, because, for example, the computing device 102 may not have access to certain features or applications. The plurality of tasks available to the user may be determined by comparing the list of supported tasks to the plurality of services available to the user on the computing device 102. The plurality of services available to the user on the computing device 102 may comprise services that the computing device 102 is capable of accessing through an application installed on the computing device 102 or through web services associated with the user account.

Server 110 may access tasks available to the user through web services associated with the user account. For example, a task available to the user may relate to opening a cloud-based text editor on the computing device 102 that may allow the user to view and edit text documents. The server 110 may access a list of services available to the user in association with the cloud-based text editor, which may include, for example, opening a document, sharing a document, or formatting a document with a previously saved template, among others. In some implementations, the user may have one or more applications installed on the computing device 102 that are not associated with the user account. The one or more applications may communicate information associated with their capabilities to the server 110 via an application programming interface and the server 110 may store the information in data store 114 in association with the user account.

In another example, a task available to a user may relate to opening a browser and navigating to one or more websites in different tabs or windows. The user may wish to plan a trip, and may state "I want to plan a trip" near the computing device 102." As discussed above, the server 110 may receive the voice input data and process the raw audio file to determine the words through, for example, the use of speech recognition. Through a comparison of the plurality of tasks available to the user and one or more determined words, the server 110 may determine that the intended task is planning a trip. As mentioned previously, the server 110 may search an indexed table comprising the plurality of tasks available to the user for each of the one or more determined words and determine a confidence value of each of the plurality of tasks. The server 110 may determine that the intended task may be an entry in the indexed table with the highest confidence value. The intended task may be associated with a plurality of services to be accessed. For example, the task related to planning a trip may be associated with a flight booking website, hotel reservation website and a general search website. Computing device 102 may access these websites through opening tabs for each of the websites or starting applications that are associated with each of the websites.

In block 215 of FIG. 2, contextual information related to the intended task may be obtained. The contextual information may be any information associated with the intended tasks. In some cases, contextual information may be obtained from the user. The server 110 may determine that additional information may be needed from the user to complete the intended tasks. The server 110 may provide for transmission to the computing device 102 a request for information associated with the intended task. The computing device 102 may display the request for information. Alternatively, the computing device 102 may provide an audio feedback (e.g., through a speaker or audio output connection) corresponding to the request for information. The audio feedback may be provided using text-to-speech algorithms on the request for information. The user may respond to the request for information by a second voice input or other user inputs on the computing device 102. Other user inputs may include pressing or touching a user interface element corresponding to an answer to the request for information. The computing device 102 may send the user input data to the server 110.

For example, the user may wish to plan a trip, and may state "I want to plan a trip" near the computing device 102." As described above, the server 110 may determine that the intended task is planning a trip. The server 110 may further determine that additional information may be required to perform the task of planning a trip. This may be determined based on user historical activity. In some aspects, the server 110 may have access to previous actions taken by the user after receiving the voice input. The server 110 may provide for transmission to the computing device 102 a request for information associated with the intended task. The computing device 102 may provide audio feedback corresponding to a follow-up question regarding the desired destination of the trip by using text-to-speech algorithms. The user of computing device 102 may respond to the follow-up question by stating "I want to go to Paris." A user input data comprising information related to the user response may be captured by the computing device 102. Computing device 102 may send the user input data to the server 110.

In some aspects, the contextual information may be social graph information, a user historical activity, among others. Social graph information may be information associated with a graph that depicts personal relationship among users in a social networking service. The server 110 may access the social graph information from the social networking service associated with the user account. Examples of social graph information include contact information, degrees of contact, or information related to behavior of other users in the user's social graph. Contact information associated with a user may be information necessary to contact the user. For example, contact information may include cellphone numbers, email addresses, user identification for other communication services, among others. Information associated with degrees of contact may indicate how close one user is to another user in a social graph.

The social graph information may be related to the intended task when at least one service associated with the intended task requires the social graph information. The plurality of services associated with the intended task may comprise communicating with one or more users of the social network using contact information. As an example, when the intended task involves interacting with a second user, the server 110 may search for the second user's contact information. The user may wish to work on a project with a second user, and may state "I want to work on an essay with Bob," near the computing device 102. The server 110 may receive the voice input data associated with a first voice input, "I want to work on an essay with Bob," and determine that the intended task is to "work on an essay with [Contact] ." The server 110 may access the social graph information associated with the user and search for Bob's contact information, Bob's contact information may be used to start a communication between the user and Bob via, for example, a messaging service. In addition, Bob's contact information may be used to start a new document on a cloud-based text editor that may be editable by Bob.

User historical activity may be past user activity associated with the intended task and may be associated with a user account. The server 110 may store the types of services previously accessed and the order in which the services were previously accessed in association with an intended task. The server 110 may determine that the services currently being accessed are associated with an intended task based on the name of the service or content provided by service and store the user activity in association with the intended task. For example, a user may be browsing the internet to plan a trip. The user may first access a flight booking website. The user may book a flight and then visit a hotel reservation website to reserve a room. The specific websites that the user accessed and the order in which the websites were accessed may be stored in association with the intended task.

In block 220, a plurality of services to be accessed at the computing device 102 may be determined based on the intended task and the obtained contextual information. As mentioned previously, the server 110 may have access to a list of plurality of tasks available to the user on the computing device 102. The list of plurality of tasks available to the user may be created from accessing information regarding features of the web services associated with the user account or may be obtained from applications installed on the computing device 102 through, for example, an application programming interface (API). The server 110 may select an intended task among the list of plurality of tasks based on methods described above. The intended task may be associated with a predefined plurality of services to be accessed. The server 110 may use the contextual information to customize the plurality of services to be accessed. For example, the server 110 may use the contextual information to initiate a feature of a service, to select a subset of the plurality of services associated with the intended tasks, to determine the order in which the plurality of services are accessed and displayed, among others.

The contextual information may be used to initiate a feature of a service. Some services may require some information to be initiated and contextual information may be utilized to supply the required information. As mentioned above, some tasks may require social graph information. For instance, when the intended task involves interacting with a second user, one service associated with the intended task may be a video call with the second user. The server 110 may determine from contextual information the contact information of the second user. The server 110 may send instructions associated with a video call to the second user to the computing device 102 for execution at the computing device 102.

The server 110 may rank the plurality of services associated with the intended task based on the user historical activity and the social graph information. The server 110 may rank the plurality of services based on a calculated score for each of the plurality of services associated with the intended task. The score may be determined through a weighted value of the user historical activity and social graph information. On example calculation may be in the format provided below:

$$\text{Calculated Score} = \Sigma_{i=1}^{n} w_n f_n \qquad \text{Equation(1)}$$

where each of the $f_n$ is a factor associated with either the user historical activity or the social graph information and each of the $w_n$ is a weight assigned to the factors. The factors associated with historical activity may be previous activity by the user associated with the intended task. Examples of previous activity by the user may be, for example, the number of times a service was accessed, the number of times a service provided by server 110 was not used by the user, or the sequence of services accessed for a given task. The server 110 may have a counter that is incremented each time a service is accessed. The number associated with the counter may be used as a value of one of the factors. In another example, as further discussed below, the server 110 may keep track of the number of times the user opts to use a different service instead of the one provided by the server 110. The factors associated with social graph information may be the number of times the user's contacts in the social graph posts about a certain service. In some cases a greater weight would be given to posts shared by contacts more closely related to the user. The degree of connection may be determined by a type of connection between the user and a contact, or a number of shared connections between the user and the contact. Although a method of calculating a relevance score based on a weighted sum is disclosed, other calculations may also be used, such as weighted product model.

Based on the calculated relevance score for each of the plurality of services associated with the intended task, the server 110 may select a subset the plurality of services associated with the intended task. For example, the intended task may be to view the latest news. The server 110 may obtain contextual information related to the intended task, such as most popular news sites. The server 110 may access user historical activity comprising the most frequently visited user websites related to the news. In some cases, the server 110 may receive social graph information which may include news articles shared by people in the user's social graph. Social graph information may further comprise information regarding degrees of contact. The intended task may be associated with a plurality of services to be performed at the computing device 102. In particular, the intended task may be associated with a plurality of news websites to open. The server 110 may determine a subset of the plurality of news websites based on various factors, such as the frequency of user visits to the news websites and whether the news websites have been shared by contacts in the user's social graph. News websites that are shared by contacts closer to the user (contacts who have a greater number of shared connections with the user in the social network) or shared more frequently may be given greater weight. The server 110 may select a predetermined number of websites to open.

In some aspects, the server 110 may determine the order in which to display or access the plurality of services on the computing device by ranking the plurality of services based on the contextual information. The ranking may be determined based on the user historical activity, where the user historical activity may include information on a sequence of services being accessed in association with an intended task. The services may be displayed in the order of their respective ranks. In some cases, the services may be categorized into a plurality of types of services, and the server 110 may determine that the services with the highest rank in each of the plurality of types of services are displayed. For example, the intended task may be to plan a trip. The server 110 may Obtain contextual information related to planning a trip. This may involve accessing user historical activity. In particular, the server 110 may determine the most frequently accessed trip planning websites. The server 110 may determine that the plurality of services to be accessed at the computing device 102 is associated with three different types of websites. Server 102 may rank all of the websites associated with the intended task and select the highest ranked website among the first type of websites, the highest ranked website among the second type of websites, and the highest ranked websites among the third type of websites, Computing device 102 may access these three websites by opening three different tabs, where each of the three tabs is accessing a website. Based on user historical activity, the server 110 may determine the order and the number of tabs to be opened. In some cases, the server 110 may determine the placement of tabs to be displayed. The first service may be associated with a flight booking website, the second service may be associated with a hotel reservation website, and third service may be associated with a search result page based on a search query related to the destination. The order of the tabs displayed on the user interface may correspond to a sequence of past user activity related to the intended task.

Figure 3:
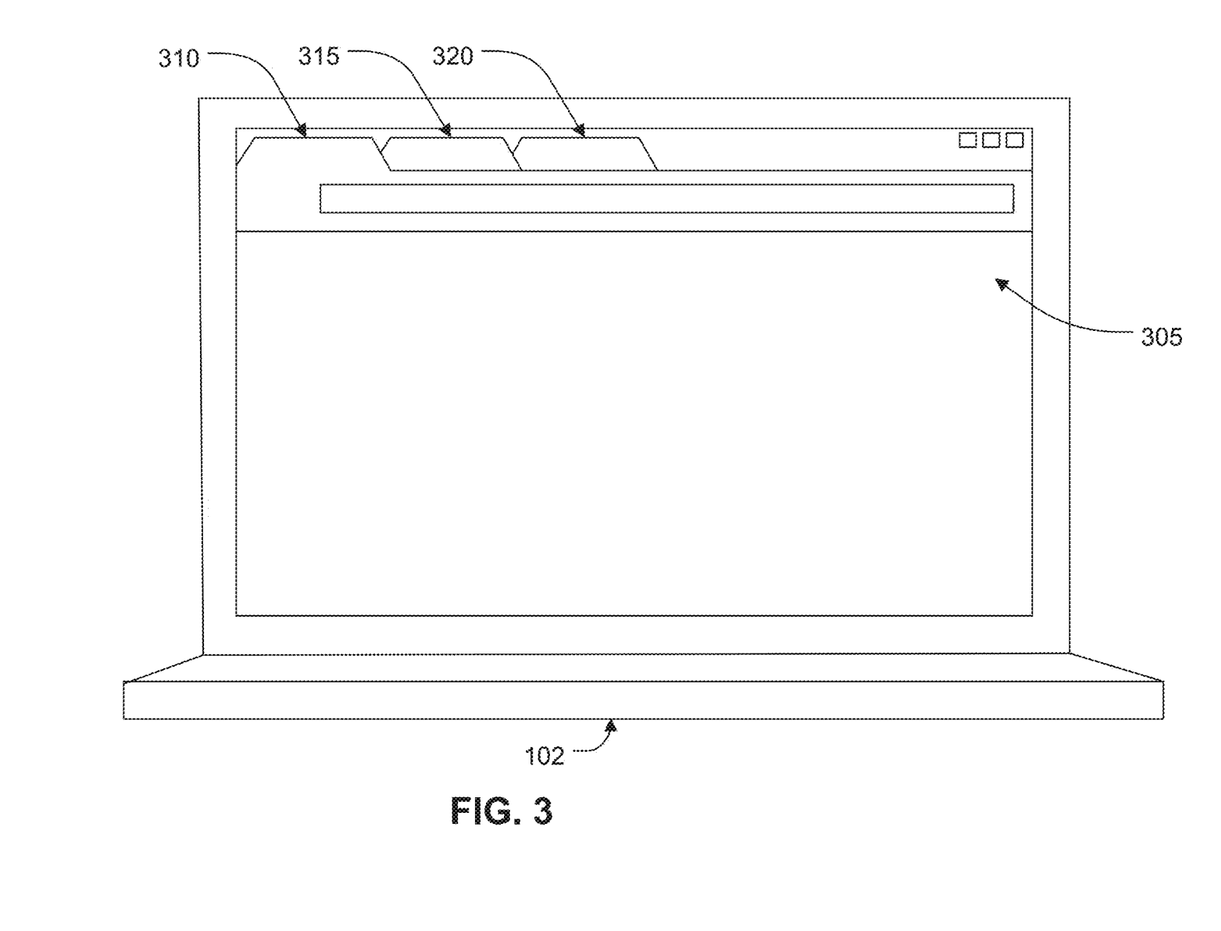
FIG. 3 shows an example interface in accordance with various aspects of the subject technology.

In block 225, instructions associated with the plurality of services are provided for transmission to the computing device 102 for execution at the computing device 102. FIG. 3 shows an example interface that may be displayed as a result of instructions provided by the server 110 in block 225. More specifically, FIG. 3 shows an interface 305 as displayed on a screen of the computing device 102. The interface 305 includes tabs 310, 315, and 320.

Based on the instructions from the server 110, the computing device 102 may display interface 305 with tabs 310, 315 and 320. Instructions associated with the plurality of services to be accessed may comprise instructions for opening a plurality of tabs, where each of the plurality of tabs accesses a website associated with a respective one of the plurality of services. For example, tab 310 may display a flight booking website, tab 315 may display a hotel booking website, and tab 320 may be general information about the destination generated from a search query. The specific websites and the order in which the tabs are presented may be based on user historical activity and social graph information. Although the plurality of services to be accessed at computing device 102 is described in association with opening a plurality of tabs, accessing the plurality of services is not limited to opening tabs. In some instances, accessing the plurality of services may be associated with opening one or more new browser windows or opening one or more applications installed on the computing device 102, The instructions associated with plurality of services to be accessed may comprise instructions for opening a plurality of applications, where each of the plurality of applications corresponds to a respective one of the plurality of services.

In one or more implementations, the process 200 may be associated with a user changing the user's credit card information. For example, the user may need to update the user's credit card information on one or more websites due to, for example, a change in the expiration dates. The user may state "I want to change my credit card information" near the computing device 102. The computing device 102 may capture a voice input as described above and send a voice input data to the server 110. In block 205, the server 110 may receive the voice input data and in block 210, the server 110 may determine the intended task. The intended task may be to update the user's credit card information and may be determined by comparing the voice input data to the plurality of tasks available to the user as described above. In block 215, the server 110 may obtain contextual information related to the intended task. In this example, the server 110 may obtain user historical activity. The user historical activity may include the user's past browsing history as well as user accounts for shopping websites. In block 220, the server 110 may determine the plurality of services to be accessed on computing device 105 based on the intended task and the obtained contextual information. For example, the server 110 may determine a plurality of websites to be accessed based on the intended task and the contextual information, where each of the tabs may correspond to a website that may include the user's credit card information. In block 225, the server 110 may provide the instructions associated with the plurality of services for transmission to the computing device and for execution at the computing device 102. The computing device 102 may display the interface 305 with tabs 310, 315 and 320, where each of the tabs corresponding to a page associated with changing the credit card information. Through the process, the user may quickly access multiple websites to update the user's credit card.

In some aspects, the server 110 may receive user feedback data from the computing device 102. User feedback data may comprise any user interaction with the computing device 102 that is detected within a predetermined time threshold after the server 110 provided the instructions to the computing device 102. The server 110 may determine that the user did not intend to access the plurality of services when the user accesses a different service. If the computing device 102 does not carry out a task intended by the user in response to a voice input, then the user may interact with the computing device 102 shortly after the instructions associated with the plurality of services are provided for transmission to the computing device 102. The voice input data, the intended task, the user feedback data and the determination that the plurality of services was not intended by the user may be stored in association with the user historical activity. This information may be accessed next time a voice input data is received from the computing device 102.

For example, the intended task may be to plan a trip. Using the methods described above, the server 110 may provide instructions associated with a first plurality of services for transmission to the computing device 102 and for execution at the computing device 102. The first service may be associated with a first flight booking website, the second service may be associated with a hotel reservation website, and third service may be associated with a search result page based on a search query related to the destination. The server 110 may detect that computing device 102 is accessing a different service, for example a second flight booking website. Based on this information, the server may determine that the user did not intend to access the first flight booking website. The server 110 may store information associated with the voice input data, the intended task, the user feedback data and the determination that the plurality of services was not intended by the user. Next time the server determines that the intended task is planning a trip, the server 110 may access the stored information to determine a second plurality of services to be accessed at the computing device, where the second plurality of services includes the second flight booking website.

Figure 4:
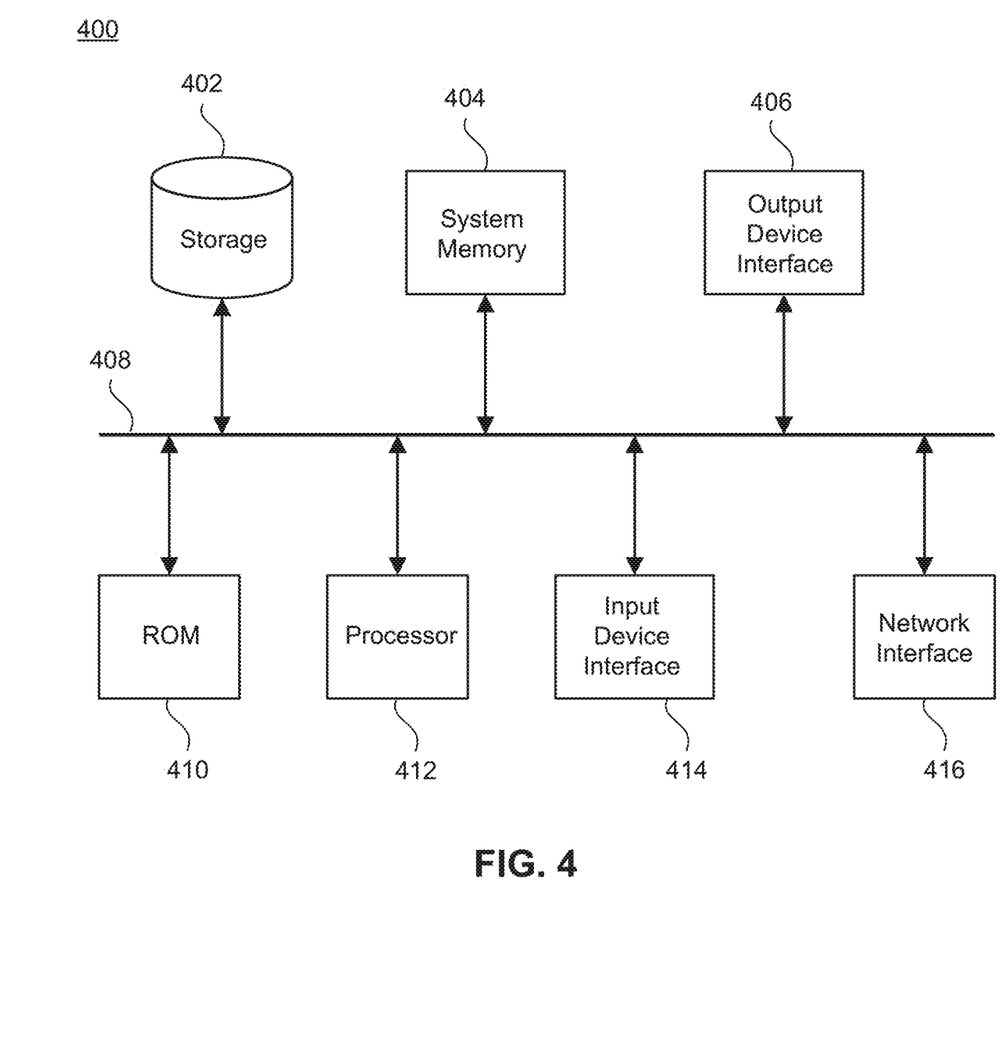
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as a random access memory. System memory 404 stores some of the instructions and data that the processor needs at runtime. In some implementations, the processes of the subject disclosure are stored in system memory 404, permanent storage device 402, or ROM 410. For example, the various memory units include instructions fir displaying web pages, processing user entries to the web pages, and generating URLs, in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network. (not shown) through a network interface 416. In this manner, the computer can be a part of a network of computers (for example, a local area network (LAN), a wide area network (WAN), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-t)-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
   receiving input data from a computing device;
   determining an intended task based on the received input data;
   obtaining contextual information related to the intended task;
   determining a plurality of tabs to open associated with websites to be accessed at the computing device, wherein each of the plurality of tabs accesses a website that is associated with the intended task and the obtained contextual information;
   providing instructions associated with opening the determined plurality of tabs for transmission to the computing device and for execution at the computing device; and
   ranking the websites based on the contextual information, wherein the instructions associated with the opening of the determined plurality of tabs comprise instructions to arrange a display of the plurality of tabs on the computing device based on the ranking.

2. The computer-implemented method of claim 1, wherein determining the intended task comprises:
   comparing the received input data to a plurality of tasks available to a user; and
   selecting a task from the plurality of tasks available to the user as the intended task based on the comparison of the received input data to the plurality of tasks available to the user.

3. The computer implemented method of claim 1, wherein obtaining contextual information related to the intended task comprises:
   providing for transmission to the computing device a request for information associated with the intended task; and
   receiving user input data from the computing device in response to the request, wherein the contextual information comprises the received user input data.

4. The computer-implemented method of claim 1, wherein the contextual information further comprises social graph information, and wherein determining the websites to be accessed is further based on the social graph information.

5. The computer-implemented method of claim 4, wherein the social graph information comprises contact information from a social network, and wherein the websites to be accessed are configured to communicate with one or more users of the social network using the contact information.

6. The computer-implemented method of claim 1, wherein the instructions associated with opening the determined plurality of tabs comprises instructions for opening a plurality of applications associated with the websites, and wherein each of the plurality of applications corresponds to a respective one of a plurality of services.

7. The computer-implemented method of claim 1, further comprising:
   calculating relevance scores for each of the websites associated with the intended task based on at least a first weighted value and a second weighted value, each of the weighted values being associated with the contextual information,
   wherein determining the plurality of tabs to open associated with websites to be accessed comprises selecting a subset of the websites associated with the intended task based on the calculated relevance scores.

8. The computer-implemented method of claim 1, wherein the contextual information comprises user historical activity data, and wherein determining the websites to be accessed is based on the user historical activity data.

9. The computer-implemented method of claim 8, further comprising:
  determining, based on the user historical activity data, that one or more of the web sites were not intended by the user; and
  storing the input data, the intended task, the user historical activity data and the determination that the one or more websites were not intended by the user in association with the user historical activity.

10. The computer-implemented method of claim 1, wherein the input data comprises voice input data.

11. A system, comprising:
  one or more processors; and
  a non-transitory computer-readable medium having instructions stored therein, which when executed by the one or more processors, cause the one or more processors to:
    receive input data from a computing device;
    determine an intended task based on the received input data;
    obtain contextual information related to the intended task;
    determine a plurality of tabs to open associated with websites to be accessed at the computing device, wherein each of the plurality of tabs accesses a website that is associated with the intended task and the obtained contextual information;
    provide instructions associated with opening the determined plurality of tabs for transmission to the computing device and for execution at the computing device; and
    rank the websites based on the contextual information,
    wherein the instructions associated with the opening of the determined plurality of tabs comprise instructions that, when executed, cause the one or more processors to arrange a display of the plurality of tabs on the computing device based on the ranking.

12. The system of claim 11, wherein determining the intended task comprises:
  comparing the received input data to a plurality of tasks available to a user; and
  selecting a task from the plurality of tasks available to the user as the intended task based on the comparison of the received input data to the plurality of tasks available to the user.

13. The system of claim 11, wherein obtaining contextual information related to the intended task comprises:
  providing for transmission to the computing device a request for information associated with the intended task; and
  receiving user input data from the computing device in response to the request, wherein the contextual information comprises the received user input data.

14. The system of claim 11, the operations further comprising:
  ranking the websites based on the contextual information, wherein providing instructions associated with opening the determined plurality of tabs comprises instructions to arrange a display of the plurality of tabs on the computing device based on the ranking.

15. The system of claim 11, wherein the contextual information comprises user historical activity data, and wherein determining the websites to be accessed is based on the user historical activity data.

16. The system of claim 15, the operations further comprising:
  determining, based on the user historical activity data, that one or more of the websites were not intended by the user; and
  storing the input data, the intended task, the user historical activity data and the determination that the one or more websites were not intended by the user in association with the user historical activity data.

17. The system of claim 11, wherein the input data comprises voice input data.

18. A non-transitory machine-readable medium comprising instructions stored therein, which when executed by a machine, cause the machine to:
  receive voice input data from a computing device;
  determine an intended task based on the received input data;
  obtain contextual information related to the intended task;
  determine a plurality of tabs to open associated with websites to be accessed at the computing device, wherein each of the plurality of tabs accesses a website that is associated with the intended task and the obtained contextual information;
  provide instructions associated with opening the determined plurality of tabs for transmission to the computing device and for execution at the computing device; and
  rank the websites based on the contextual information,
  wherein the instructions associated with the opening of the determined plurality of tabs comprise instructions that, when executed, cause the machine to arrange a display of the plurality of tabs on the computing device based on the ranking.

19. The non-transitory machine-readable medium of claim 18, wherein determining the intended task comprises:
  comparing the received input data to a plurality of tasks available to a user; and
  selecting a task from the plurality of tasks available to the user as the intended task based on the comparison of the received input data to the plurality of tasks available to the user.

20. The non-transitory machine-readable medium of claim 18, further comprising:
  determining a plurality of services to be accessed at the computing device based on the intended task and the obtained contextual information; and
  ranking the plurality of services based on the contextual information,
  wherein providing the instructions associated with opening the plurality of tabs comprise instructions to arrange the plurality of tabs on the computing device based on the ranking.

* * * * *